Sept. 10, 1935.    C. M. LEATHERMAN    2,014,024
COMPASS MECHANISM
Filed May 14, 1931
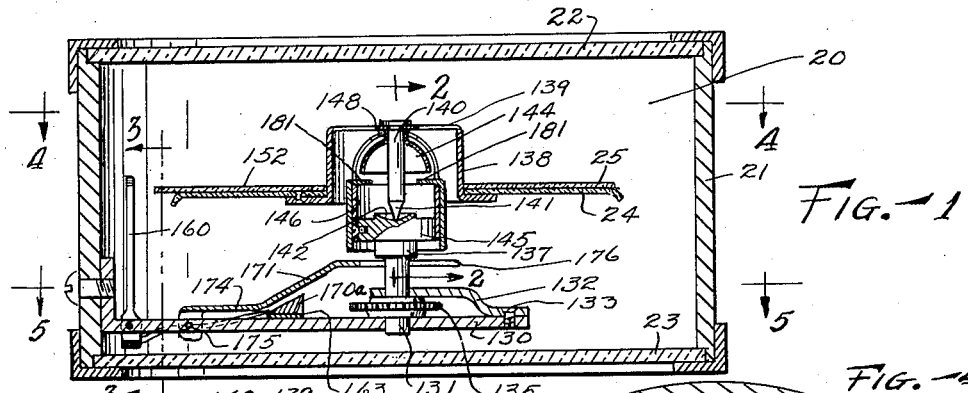
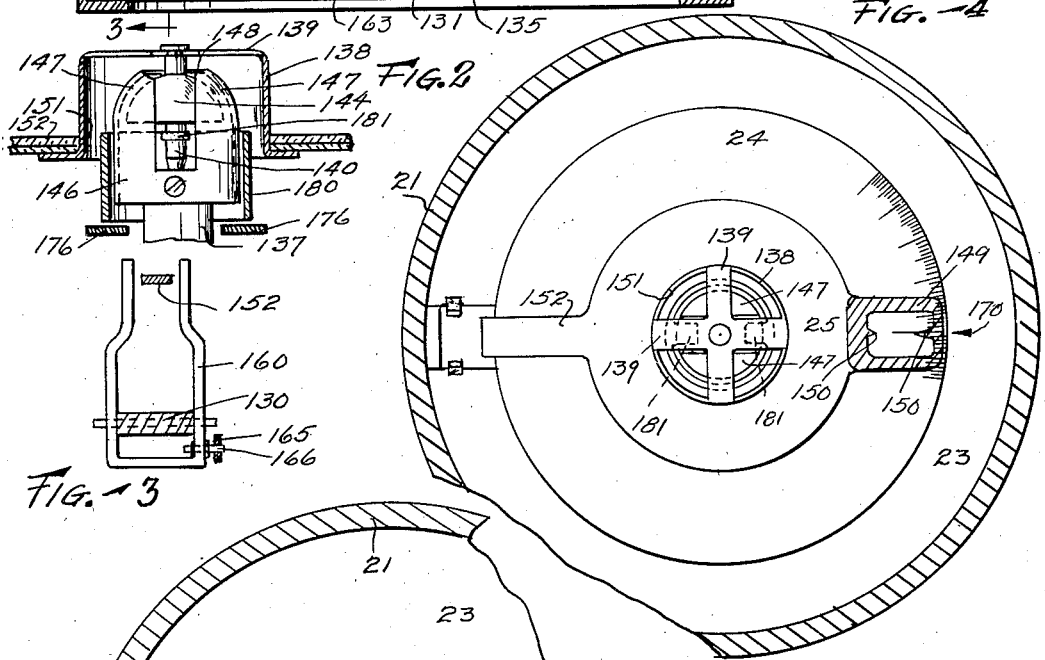
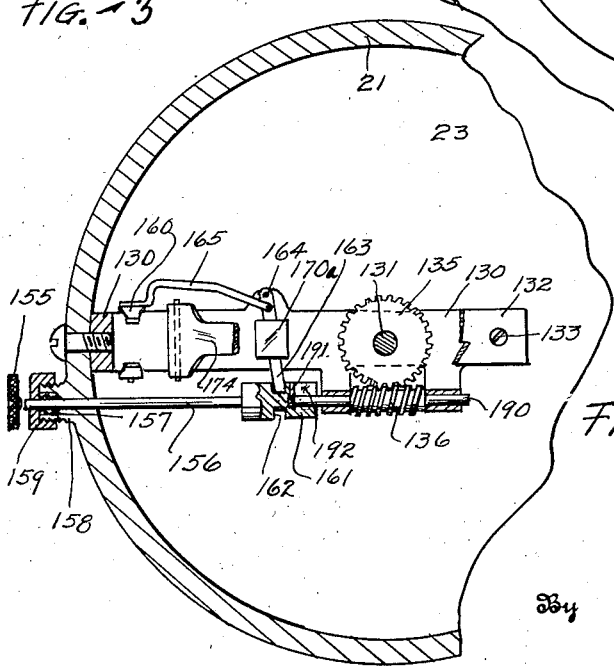
Inventor
CLARENCE M. LEATHERMAN
By Frank D. Gray
Attorney Patented Sept. 10, 1935

2,014,024

UNITED STATES PATENT OFFICE 2,014,024

COMPASS MECHANISM

Clarence M. Leatherman, Coldwater, Mich.

Application May 14, 1931, Serial No. 537,302

5 Claims. (Cl. 33—224)

This invention relates to a compass and especially such mechanism adapted for aerial navigation.

It is a special object of my invention to provide a compass of the type having a dial enclosed in a liquid container, with a setable indicator which may be moved relative to the dial to indicate any course desired and thereafter move relative to the dial to enable the navigator to guide his ship, if the compass is to be used thereon, on any given course without having to constantly read the indicia on the compass dial, but rather align a marker or sight on the setable indicator with the compass pointer, thereby simplifying the navigator's work.

However it is to be understood that while my compass is especially advantageous for such use, it nevertheless is readily adapted for use in other forms of navigation, such as in submarines, steamships and the like. The essential and novel features of my invention will be brought out in the appended claims.

In the drawing Figure 1 is a vertical section, on an enlarged scale of the compass mechanism;

Figures 2 and 3 are fragmental vertical sections of the compass mechanism and are indicated by the lines 2—2 and 3—3 respectively on Figure 1;

Figures 4 and 5 are horizontal sections of the compass mechanism and are indicated by the lines 4—4 and 5—5 respectively on Figure 1.

In the drawing my improved compass is designated by the numeral 20 and comprises a casing 21 provided with transparent top and bottom plates 22 and 23 respectively. Within the casing is a compass dial 24 and a setable indicator 25, both of which are translucent.

The compass frame or case 21 is cylindrical in form, has top and bottom closure plates 22 and 23 of clear glass, and provides a liquid receptacle.

Rigidly secured to the inner wall of the compass case or frame 21 is a bracket 130 which extends adjacent the bottom wall 23 of the compass case and some distance beyond the axis thereof. Journalled in this bracket 130 is a shaft 131 extending vertically upward from the bracket 130 along the axis of the case 21. A second bearing member 132 is secured to the bracket 130 at 133 and assists in maintaining the alignment of the shaft 131. Interposed between the bearing members 130 and 132, and rigidly secured to the shaft 131, is a worm gear 135 adapted to mesh with a worm 136, (Fig. 5) the rotation of which causes the shaft 131 to rotate in its bearings for a purpose to be hereinafter described. The worm gear 135 also acts as a set collar to prevent longitudinal movement of the shaft 131 in its bearings.

Adjacent the upper end of the shaft 131 and rigidly secured thereto is a pivot seat bearing 137 adapted to support the compass dial 24 and its associated parts. The compass dial 24 is rigidly secured to the outwardly flanged bottom edge of a cylindrical frame 138, (Figs. 1, 2 and 4). The upper end of this frame 138 is provided with suitable cross members 139, to which is rigidly secured a pivot pin 140, having a point 141 adapted to coact with a conical seat 142 formed in the upper end of the shaft 131.

To prevent distant separation between the pivot pin 140, and its seat 142, and likewise prevent excessive tilting of the dial relative to the compass case, I secure a bell or hemi-spherical cup 144 to the pivot pin 140. Secured to a bushing 145, rigidly carried by the shaft 131, is a cylinder or shell case 146 having upwardly and inwardly curved arms 147 which are spaced apart from and follow the contour of the bell 144 as shown in Figs. 1 and 2. The upward movement of the bell 144, the pivot pin 140, the frame 138 and dial 24, relative to the shaft 131, is therefore limited to the distance between the bell 144 and the shell case 146. The upper end of the shell case 146 is provided with an opening 148 of such a diameter as will permit free rotation and oscillation of the pivot pin 140 and dial 24, but, at the same time prevent excessive tilting of the dial 24 relative to the compass case.

Resting on the top face of the dial 24 is an indicator arm 25, which like the dial is made of a clear transparent material and has painted or otherwise impressed thereon a translucent colored bracket 149 provided with pointers 150, and the indicator is provided with a cylindrical opening 151 by means of which the indicator 25 is journalled on the frame 138. The indicator 25 is also provided with an arm 152 extending diametrically from the indicator 149, beyond the outer edge of the dial 24 and serves a purpose to be hereinafter described. The dial 24, the indicator 25 with its arm 152, the bell 144 and the frame 138 are all in perfect balance on the pivot seat 142 and are free to rotate thereon, due entirely to the influence of the earth's magnetism. As is usual in compasses of this type, the case 21 is filled with a light non-viscous liquid and entirely free from air.

The arrangement of the compass 20 is such that the pilot may readily change the relationship between the compass dial 24 and the indicator 25 thereby setting his course on the dial. This is accomplished by the turning of a knurled head 155 secured to a shaft 156 which passes freely out through the compass case 21 as shown in Fig. 5. Suitable packing 157, secured in place in an outwardly extending boss 158 of the compass case 21, by a packing nut 159, prevents the escape of the liquid within the compass.

The arrangement of the shaft 156 is such that the pilot first pulls it outwardly to raise the dial 24 and its associated parts free from the pivot seat 142 and clutch them to the shaft 131. This movement simultaneously brings a yoke 160 into contact with the arm 152 of the indicator 25, to prevent the rotation of the latter.

Rigidly secured to the inner end of the shaft 156 (Fig. 5) is a sleeve 161, having an annular groove 162 adapted to embrace one end of a lever 163 which is pivoted to the bracket 130 as at 164. Pivoted to the lever 163 (Figs. 1 and 2) is one end of the link 165, the other end of which is pivoted to an arm 166 of the yoke 160 pivotally carried by the bracket 130. This arrangement of parts is such that when the shaft 156 is pulled outwardly, from the compass case 21, the linkage causes the upper end of the yoke 160 to swing towards and embrace the outwardly extending arm 152 of the indicator 25 and prevent its rotation.

It is of course understood that this setting is performed when the compass indicator points 150 are diametrically opposite the yoke, this is accomplished by turning the ship until the compass indicator points 150 align with a mark 170 on the bottom plate 23 of the compass case 21.

The same outward movement of the shaft 156, that causes the yoke 160 to engage the indicator arm 152 also clutches the compass dial 24 to the shaft 131. Secured to the lever 163 is a cam block 170ª which, as the shaft 156 is moved outwardly, is brought into contact with the sloping surface 171 of a lever 174 which is pivoted as at 175 to the bracket 130. The lever 174 extends inwardly and is provided with forked ends 176 which embrace the shaft 131 as shown in Figs. 1 and 2. When the shaft 156 is moved outwardly the lever 174 is raised by the cam 170ª, causing the forked ends 176 to engage and raise a cylinder 180 (Figs. 2, 3 and 4). The cylinder 180 surrounds, and is loosely slidable on the shell case 146 and, is provided with a pair of inwardly extending ears 181. The ears 181 slide in vertical slots 182 in the shell case 146, and normally a little distance beneath the bell 144. The ears 181 and slots 182 provide a clutch connection whereby the cylinder 180 is rotated as a unit with the shaft 131 and shell case 146.

When the cylinder 180 is raised, the ears 181 thereof engage the lower edge of the bell 144 and raise it from the pivot seat 142, together with its associated dial 24, the pivot pin 140 and case 138, supporting them entirely by the forks 176 through the cylinder 180. Hence when the shaft 156 is rotated the dial 24, the case 138, the bell 144, the pivot pin 140, the shell cases 146, and the cylinder 146ª will rotate as a unit, and as the indicator 25 is prevented from rotation by the fork 160, the rotation of these parts will change the relation between the indicator 25 and the compass dial 24, thereby changing the setting of the compass.

The shaft 131 is rotated by the rotation of the shaft 156 by the pilot, while the latter shaft is in its outermost position. The worm 136, which meshes with the worm gear 135 rigidly secured to the shaft 131 and heretofore referred to, is rigidly mounted on a shaft 190 journalled in the bracket 130. The sleeve or collar 161 of the shaft 156 slidably embraces the end of the shaft 190 and is splined thereto by means of a pin 191, in the shaft adapted to coact with a suitable slot 192 in the collar.

Having set forth the principles of my invention, and described and illustrated an embodiment thereof for practical use, what I claim and desire to secure by Letters Patent, is,—

1. A compass comprising a liquid receptacle, bearings mounted in the receptacle, a vertical shaft journalled in said bearings, a gear on said shaft, a second shaft journalled in the casing and projecting outside the wall thereof, a gear on said last named shaft and adapted to mesh with the first named gear, a dial mechanism balanced for rotation and oscillation on the first named shaft, means associated with the second-named shaft adapted to raise the dial mechanism from its seat and clutch it for rotation on said first named shaft, a pointer carried by the dial, and means to engage the pointer and prevent its rotation when the dial mechanism is raised from its seat whereby the dial may be rotated through said gearing to change its position relative to the pointer.

2. A compass comprising a liquid receptacle, bearings mounted in the receptacle, a vertical shaft journalled in said bearings, means operative from without the receptacle to rotate said shaft, a dial mechanism balanced for rotation on said shaft, said dial mechanism comprising a balance pin, a housing carried by said pin, a dial secured to said housing, a hollow hemisphere carried by the pin and located within the housing, a casing secured to said shaft and provided with upwardly extending arms interposed between but spaced apart from the hemisphere and the housing, a sleeve slidably mounted on said casing and having inwardly extending ears coacting with the arms of the cylinder to clutch them together for rotation, said arms extending inwardly beneath the lower edges of the hemisphere, means adapted to raise the sleeve and cause the arms thereof to engage the hemisphere from its seat, thereby raising the dial mechanism from its seat, a pointer carried by the dial, means to engage the pointer and prevent its rotation when the dial mechanism is raised from its seat, whereby the dial may be rotated through said gearing to change its position relative to the pointer.

3. A compass comprising a liquid receptacle, bearings mounted in the receptacle, a vertical shaft journalled in said bearings, a gear on said shaft, a second shaft journalled in the casing and projecting outside the wall thereof, a gear on said last named shaft meshing with the first named gear, a dial mechanism balanced for rotation and oscillation under the influence of the earth's magnetism on the first named shaft, said dial mechanism comprising a balance pin, a housing carried by said pin, a dial secured to said housing, a hollow hemisphere carried by the pin within the housing, a casing secured to the first named shaft and having upwardly extending arms interposed between but spaced apart from the hemisphere and the housing, a sleeve slidably mounted on said casing, means to clutch the casing to the sleeve means carried by the casing and adapted to engage the lower edges of the hemisphere, means associated with the second named shaft adapted to raise the sleeve and said last named means to act to engage the hemisphere thereby raising the dial mechanism from its seat, a pointer carried by the dial, and means to engage the pointer and prevent its rotation when the dial mechanism is raised from its seat whereby the dial may be rotated through said gearing to change its position relative to the pointer.

4. A compass including a case, supporting means in said case, including a vertical shaft, a dial mechanism pivoted on the upper end of said shaft, a pointer carried by the dial and rotatable thereon, means to clutch the shaft to the dial mechanism, means to engage the pointer to retain the same fixed relatively to the casing, means to rotate said shaft, and means operable by said rotating means to substantially simultaneously render operative said clutch means and pointer-engaging means whereby the pointer may be adjusted relatively to the dial mechanism by rotating the shaft.

5. A compass including a liquid receptacle, supporting means in said receptacle, including a vertical shaft, a dial mechanism pivoted on the upper end of said shaft, a pointer carried by the dial and rotatable thereon, means to clutch the shaft to the dial mechanism, means to engage the pointer to retain the same fixed relatively to the receptacle, means to rotate said shaft, and means operable by said rotating means to substantially simultaneously render operative said clutch means and pointer-engaging means whereby the pointer may be adjusted relatively to the dial mechanism by rotating the shaft.

CLARENCE M. LEATHERMAN.